United States Patent
Iwasaki-Higbee

(10) Patent No.: US 7,905,255 B2
(45) Date of Patent: Mar. 15, 2011

(54) INSTALLATION OF SEALANT MATERIALS FOR REPAIR OF UNDERGROUND CONDUITS

(76) Inventor: Jeffrey L. Iwasaki-Higbee, Honolulu (HK)

( * ) Notice: Subject to any disclaimer, the term of this patent is extended or adjusted under 35 U.S.C. 154(b) by 1169 days.

(21) Appl. No.: 11/512,029

(22) Filed: Aug. 28, 2006

(65) Prior Publication Data

US 2008/0047624 A1    Feb. 28, 2008

(51) Int. Cl.
*F16L 55/16*    (2006.01)
(52) U.S. Cl. ............. 138/98; 138/97; 156/287; 156/294; 405/150.1; 264/269
(58) Field of Classification Search ................ 138/98, 138/97; 264/269, 36.17; 405/150.1; 156/287, 156/294
See application file for complete search history.

(56) References Cited

U.S. PATENT DOCUMENTS

| | | | |
|---|---|---|---|
| 3,602,263 A | 8/1971 | Bremner | |
| 3,762,446 A | 10/1973 | Tungseth et al. | |
| 4,386,628 A | 6/1983 | Stanley | |
| 4,585,371 A * | 4/1986 | Jones-Hinton | 405/153 |
| 4,646,787 A * | 3/1987 | Rush et al. | 138/98 |
| 4,867,921 A | 9/1989 | Steketee, Jr. | |
| 4,889,449 A | 12/1989 | Lee | |
| 4,972,880 A | 11/1990 | Strand | |
| 5,063,967 A | 11/1991 | Stephens | |
| 5,351,720 A | 10/1994 | Maimets | |
| 5,560,395 A | 10/1996 | Bissonnette et al. | |
| 5,632,937 A * | 5/1997 | Soofi et al. | 264/30 |
| 5,656,117 A | 8/1997 | Wood et al. | |
| 5,706,861 A | 1/1998 | Wood et al. | |
| 5,725,328 A * | 3/1998 | Schmager | 405/151 |
| 5,762,450 A * | 6/1998 | Schmager | 405/184.2 |
| 5,791,378 A | 8/1998 | Stephens | |
| 5,928,447 A * | 7/1999 | GianFrancisco | 156/94 |
| 6,056,016 A | 5/2000 | Rogers | |
| 6,167,912 B1 | 1/2001 | Stephens | |
| 6,361,015 B1 | 3/2002 | Warmerdam | |
| 6,415,824 B2 | 7/2002 | Stephens | |
| 7,012,042 B1 | 3/2006 | Cataldo et al. | |
| 2002/0083990 A1 | 7/2002 | Lundman | |
| 2002/0124898 A1 | 9/2002 | Renaud et al. | |
| 2004/0089358 A1 | 5/2004 | Burd et al. | |
| 2004/0108009 A1 | 6/2004 | Kamiyama et al. | |
| 2004/0134552 A1 | 7/2004 | Renteria | |
| 2005/0016607 A1 | 1/2005 | St. Onge et al. | |

FOREIGN PATENT DOCUMENTS

DE    40 24 926 A1    2/1992

(Continued)

*Primary Examiner* — Patrick F Brinson
(74) *Attorney, Agent, or Firm* — Chernoff, Vilhauer, McClung & Stenzel, LLP

(57) ABSTRACT

A method and apparatus for use in repairing an underground conduit, such as a sewer pipe. A tubular bladder is filled within a selected portion of the length a conduit to occupy a large part of the interior while a sealant material in a fluid state is forced into the conduit to flow along the bladder to plug and seal defects in the conduit and at least partially fill voids in adjacent soil. A slender object such as a smaller tubular bladder extends along the bladder to provide a passageway for flow of sealant to defects in the conduit. A special plug may be used to direct the sealant into a selected portion of the conduit.

16 Claims, 12 Drawing Sheets

FOREIGN PATENT DOCUMENTS

| | | |
|---|---|---|
| DE | 40 28 169 A1 | 3/1992 |
| DE | 195 38 813 A1 | 4/1997 |
| EP | 0 855 547 A1 | 7/1998 |
| GB | 2 123 919 A | 2/1884 |
| GB | 2 249 602 A | 5/1992 |

* cited by examiner

INSTALLATION OF SEALANT MATERIALS FOR REPAIR OF UNDERGROUND CONDUITS

BACKGROUND OF THE INVENTION

The present invention relates generally to the in situ repair of underground pipe systems, and more particularly to the repair of holes, cracks, and defective joints in underground conduits including electrical conduits and drainage pipe systems such as municipal and industrial sewer systems.

Underground sanitary sewer pipe systems are designed to convey raw sewage and waste water by gravity flow to waste water treatment facilities where the sewage is processed and the waste water is treated for return to the environment. Ideally a sewer system will convey sewage and waste water to a treatment facility without leakage or spillage, but many urban sanitary sewage systems are in a state of significant disrepair. As a result of defects in sewer pipe networks, groundwater surrounding sewer pipes can infiltrate into the sewer drainage systems, adding to the quantity of water which must be conveyed and treated, and thereby reducing the effectiveness and surpassing the capacity of waste water collection systems and treatment facilities. Sewer pipes may be surrounded by groundwater permanently, or on a seasonal, tidal, or rainfall related basis, any of which may contribute to overload of the downstream waste water collection systems and treatment facilities.

Additionally, depending on the height of the water table surrounding a sewer system, raw sewage may leak out of defective conduits such as sewer pipes into the surrounding soil.

Where leaking underground drainage pipes allow infiltration of groundwater into the pipes, soil particles are typically suspended in the groundwater and flow into the pipe, leaving voids in the soil where such suspended soil particles originated. When voids are left on the outside of the pipe, the pipe is no longer supported by surrounding soil and may sag or move, increasing the size of cracks in a pipe wall or gaps between adjacent pieces of pipe. Enlarged openings through the wall of a pipe naturally permit additional infiltration of surrounding groundwater, enlarging voids, until pipes eventually can collapse completely as a result of loss of support from surrounding soil.

Underground conduits thus eventually may include longitudinal cracks, larger holes where portions of a pipe wall have collapsed, defective joints between adjacent lengths of pipe, where lengths of pipe have shifted apart or where sealing material has been carried away from a joint, and gaps or defective seals where an interconnection of a smaller pipe with a larger pipe has been disturbed.

Other types of underground conduits such as water conduits for large swimming pools have similar problems, as do some underground conduits for electrical cables, which are intended to be kept largely dry.

Uncovering underground conduits to repair defects and replace defective piping is expensive, inconvenient, and dangerous, particularly where sewer pipes are situated beneath busy streets. Nevertheless, repair must be effected or voids in the soil structure along the pipes may become large enough to allow the formation of sinkholes or total collapse of streets located above such sewer pipes.

U.S. Pat. No. 6,416,692 teaches one method for sealing underground pipes, in which a quantity of a sealing material such as a curable grout is placed into a sewer conduit between inflated tubular liner bags which are everted (or inverted, as it is often termed in the industry) within the conduit. The sealing material is subjected to pressure between the liner bags as they are everted, and is thus forced outward through defects in the wall of the conduit and into the surrounding soil to form a seal. As each bag is everted further it covers grout-filled defects in the conduit and keeps the grout from returning through the defects into the interior. This method of sealing a pipe, however, does not provide for recovery or disposal of grout which does not move from the interior of the conduit into defects in the wall of the conduit and relies on accurate estimation the amount of needed grout to assure that defects are filled sufficiently.

SUMMARY OF THE INVENTION

The present invention provides a method and apparatus for use in connection with the method for effectively sealing leaks in underground conduits as defined by the following claims.

The present method in one embodiment includes the steps of isolating a section of a system of drainage piping from active use; thereafter blocking existing defects against further intrusion of groundwater by installing and pressurizing flexible tubular bladders within the section of piping to be repaired, to occupy most of the volume of a conduit with at least one tubular bladder arranged along the length of a section of piping to be repaired; sealing both ends of the section of piping to be repaired; and, while continuing to maintain pressure within the bladder or bladders within the section the of the piping to be repaired, utilizing pressure greater than the pressure of surrounding groundwater attempting to intrude through defects in the piping, to install a fluid sealant material into space between bladders and walls of the piping, and forcing effective quantities of the sealant material into and outwardly through defects existing in the pipe walls by filling a portion of the pipe surrounding the inflated bladder with such fluid sealant material under adequate pressure; thereafter, while still maintaining pressure on the bladders and fluid sealant greater than the pressure of groundwater attempting to intrude through defects in the pipe, keeping the inflated bladders in place, thus holding the sealant in place while it solidifies.

In accordance with one aspect of the method at least one additional elongate body such as a tube or rod is positioned alongside a flexible bladder filled with a fluid to occupy most of the space within an underground conduit, creating a passageway for fluid sealant material along and between the flexible fluid-filled bladder and the additional elongate body.

In accordance with one aspect of the present invention a fluid such as water, steam, or air may be used to fill bladders within the conduit being repaired and to carry heat to or away from the portion of the conduit being repaired, in order to provide an environment having a required temperature to enable use of a particular sealant material to plug and seal defects in the piping.

According to one aspect of the present method a tubular bladder or bladders can be used to sustain pressure on the sealant material while it remains fluid, in order initially to force the sealant material into leaking openings in a wall of a pipe to be repaired and thereafter to hold the sealant material in place while it solidifies and begins to cure.

In accordance with one embodiment of the method sufficient pressure is maintained within bladders within an underground conduit system to maintain pressure on a quantity of fluid sealant material within a selected portion of such an underground conduit system and force effective quantities of the fluid sealant material into external voids adjacent to openings through the walls of underground conduits being repaired.

A spacer system including an elongate main bladder may be used to occupy most of the volume of an underground conduit during the process of repair in accordance with the present method. The main bladder may be nearly as large as the interior space within the conduit to be repaired. One or more smaller elongate bladders or other elongate slender objects may extend along the main bladder through the entire length of a portion of the main bladder intended to be placed within a portion of an underground conduit to be repaired, so that a passageway for grout is formed along the main bladder adjacent to the smaller elongate bladder or slender object.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 12:
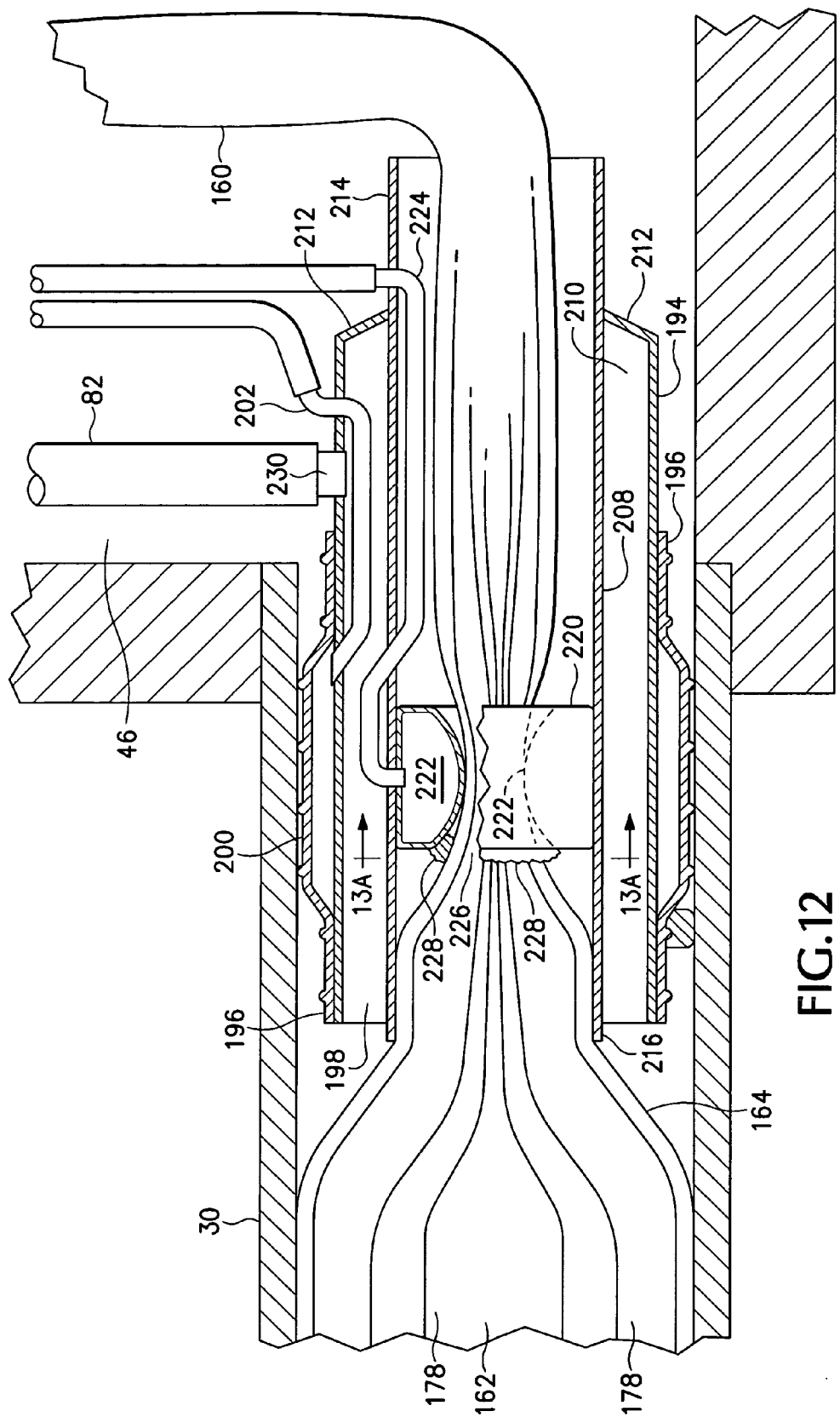
FIG. 12 is a view similar to FIG. 11 with the special plug shown in section view taken along a vertical longitudinal plane.
Figure 13A:
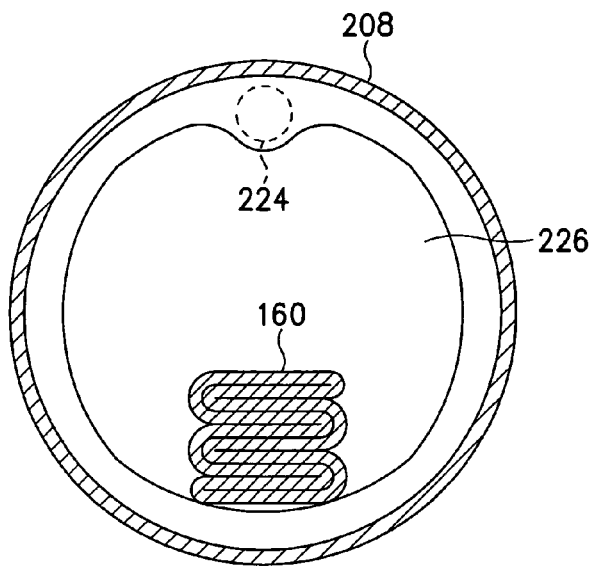
Figure 13B:
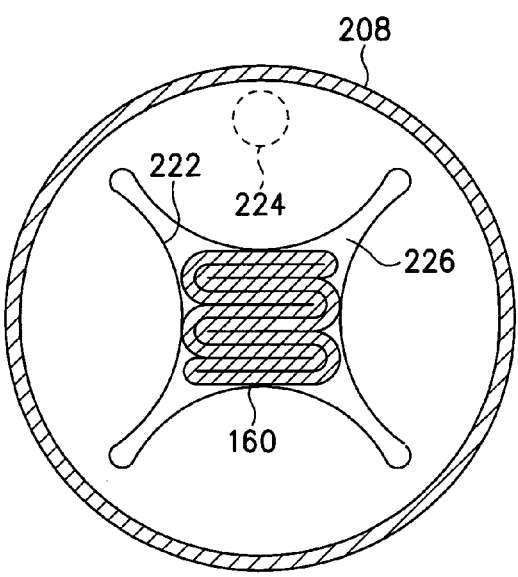
Figure 13C:
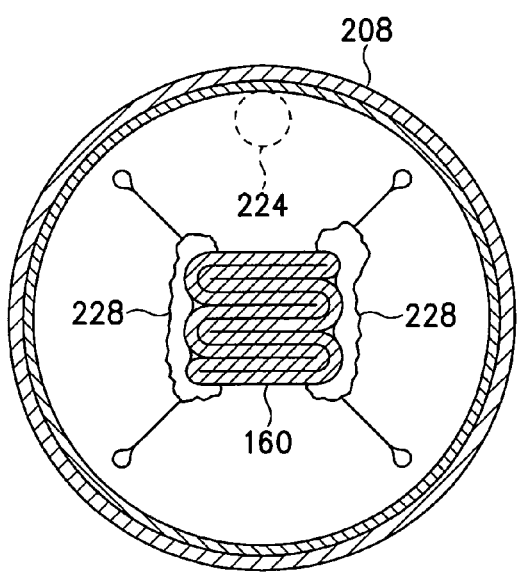

FIGS. 13A, 13B, and 13C are end elevational views taken in the direction of the line 13-13 in FIG. 12, showing a sphincter valve within the special plug in different conditions of closure.

Figure 14:
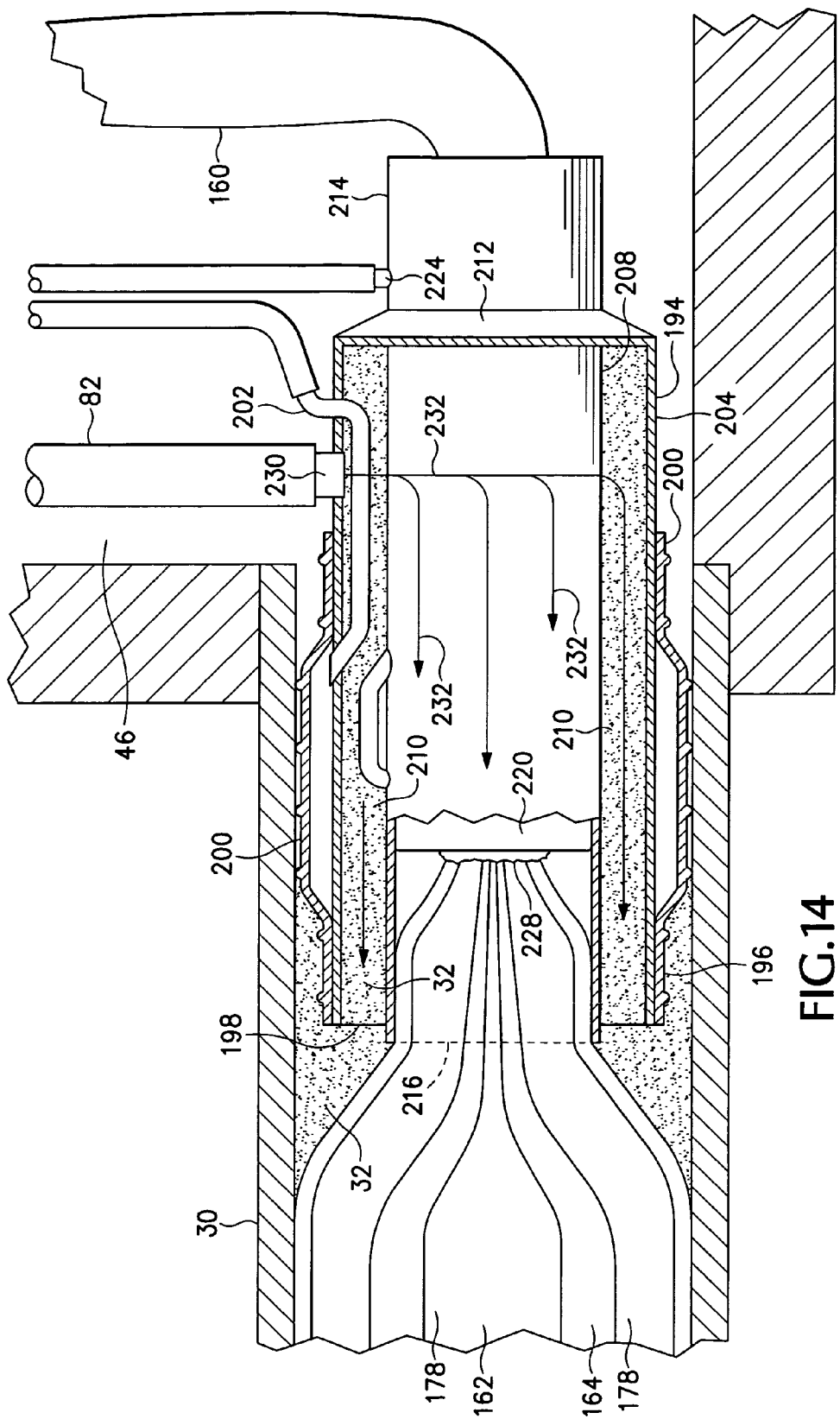

FIG. 14 is a view similar to FIG. 12 and also showing a fluid sealing material being installed through the special plug and along the inflated tubular bladder into the interior of the selected section of the underground conduit.

Figure 15:
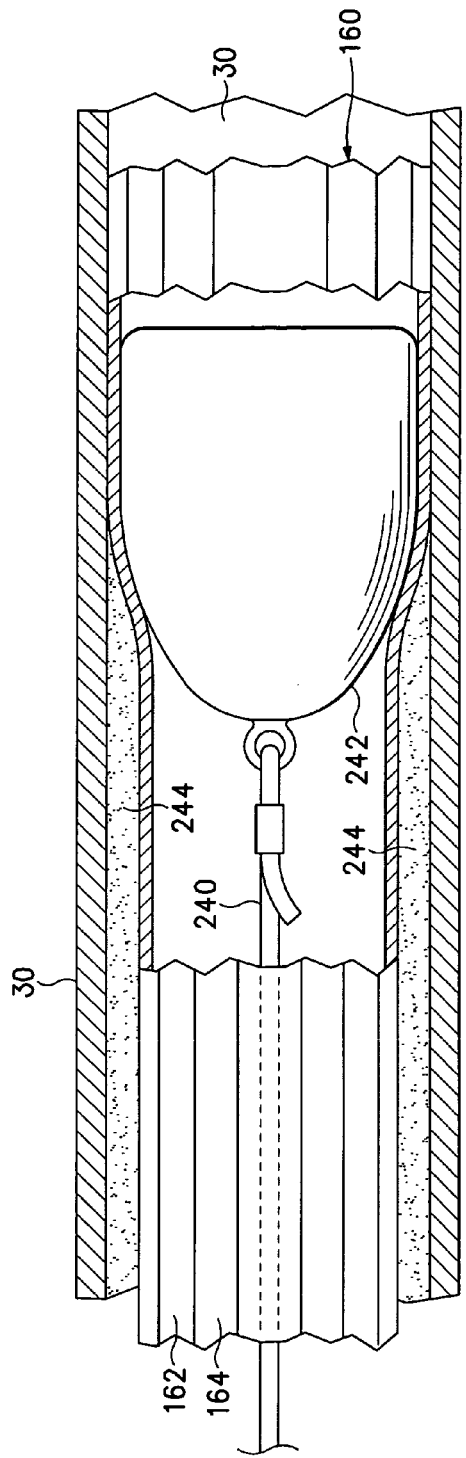

FIG. 15 is a sectional side elevational view, at an enlarged scale, of a portion of an underground conduit, with a spacer system in place together with a quantity of fluid sealing material, and showing a swab inside the tubular bladder being used to urge sealing material to move longitudinally along the interior of the underground conduit during the process of effecting repair according to one embodiment of the present method.

Figure 16:
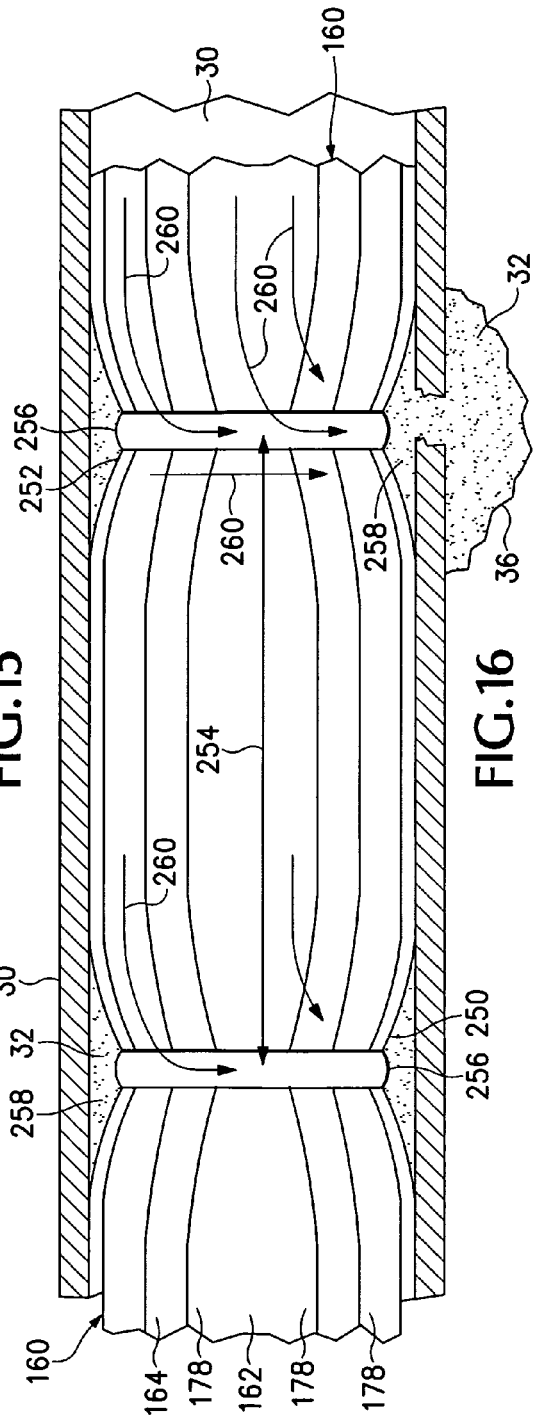

FIG. 16 is a sectional side elevational view of a portion of an underground conduit, with an alternative spacer system in place, together with a quantity of fluid sealant material.

Figure 17:
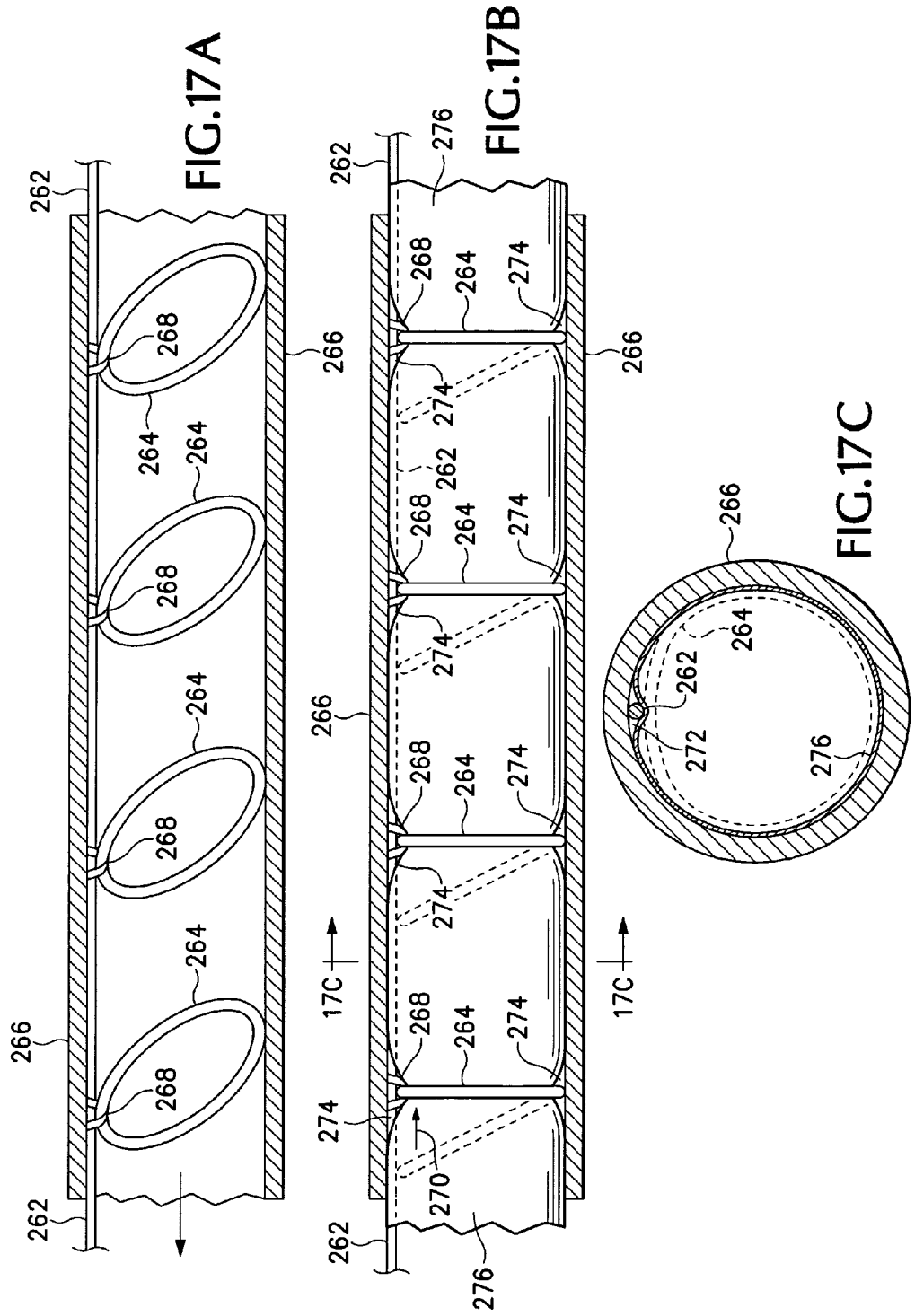

FIG. 17A is sectional side elevational view of a portion of an underground conduit with a first portion of a spacer system shown during a process of placement into the conduit.

FIG. 17B is a partially cutaway side elevational view of a portion of the underground conduit shown in FIG. 17A after completion of installation of the spacer system.

FIG. 17C is a sectional view of the conduit shown in FIGS. 17A and 17B with the spacer system in place, taken along line 17C-17C of FIG. 17B.

Figure 18:
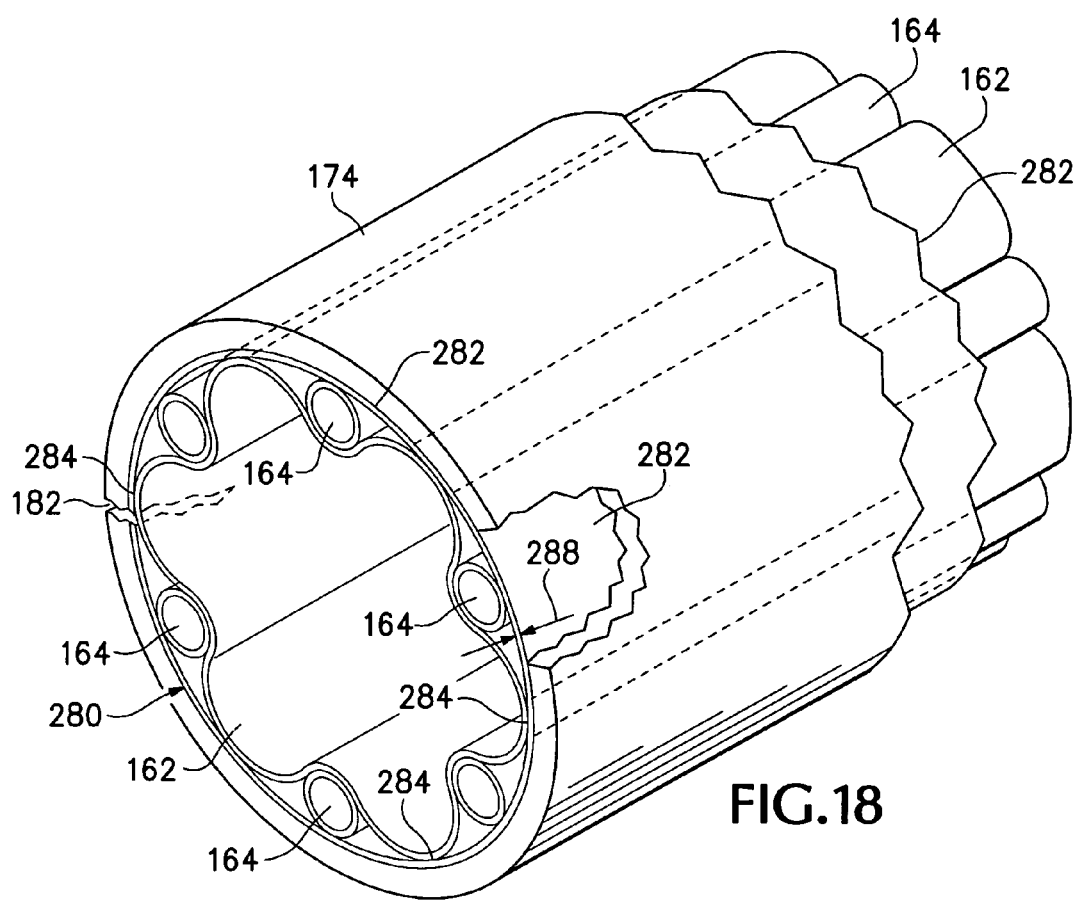

FIG. 18 is an isometric view of a section of an underground conduit cut on a transverse plane and in which is a spacer system which is another embodiment of the apparatus disclosed herein for use in repairing defective underground conduits.

Figure 19:
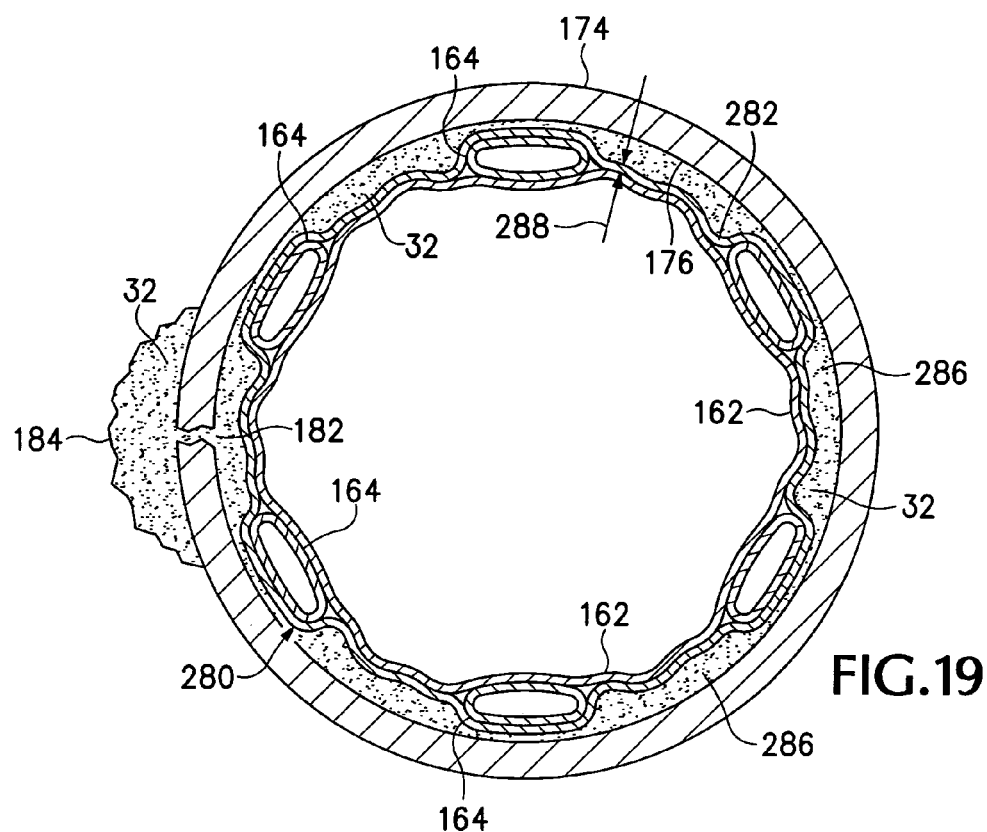

FIG. 19 is a sectional view on a transverse plane through the section of an underground conduit shown in FIG. 18, showing the spacer system in a second condition during installation of sealing material in the underground conduit.

Figure 20:
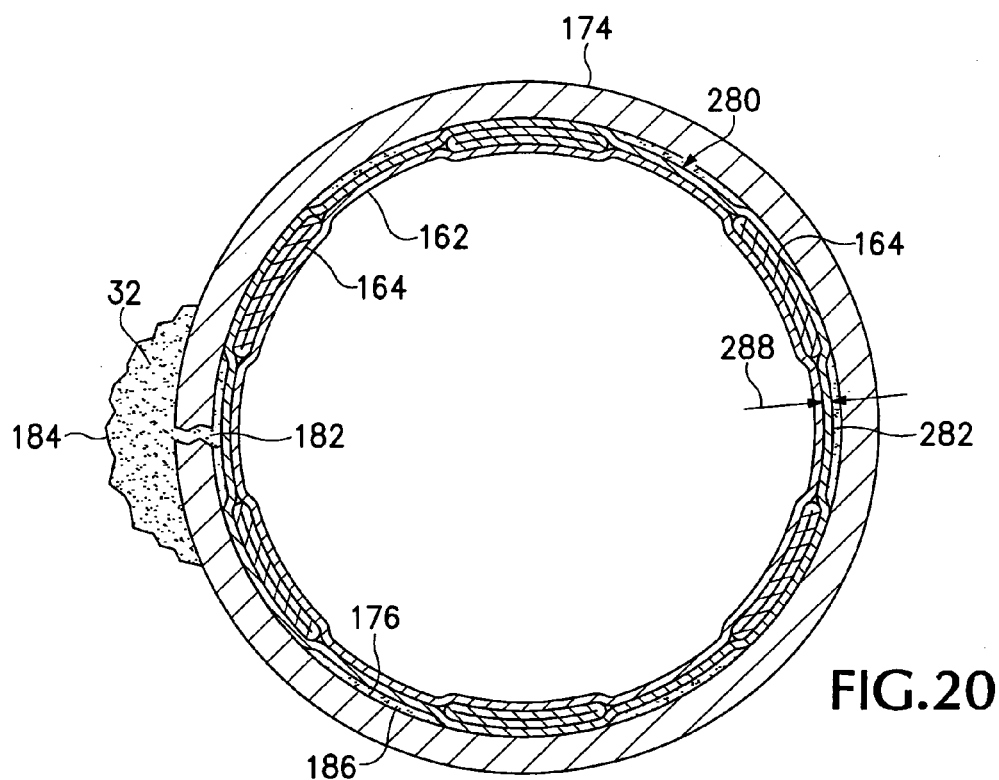

FIG. 20 is a view similar to FIG. 19, showing the spacer system occupying more of the space within the underground conduit.

DETAILED DESCRIPTION OF EMBODIMENTS

Figure 1:
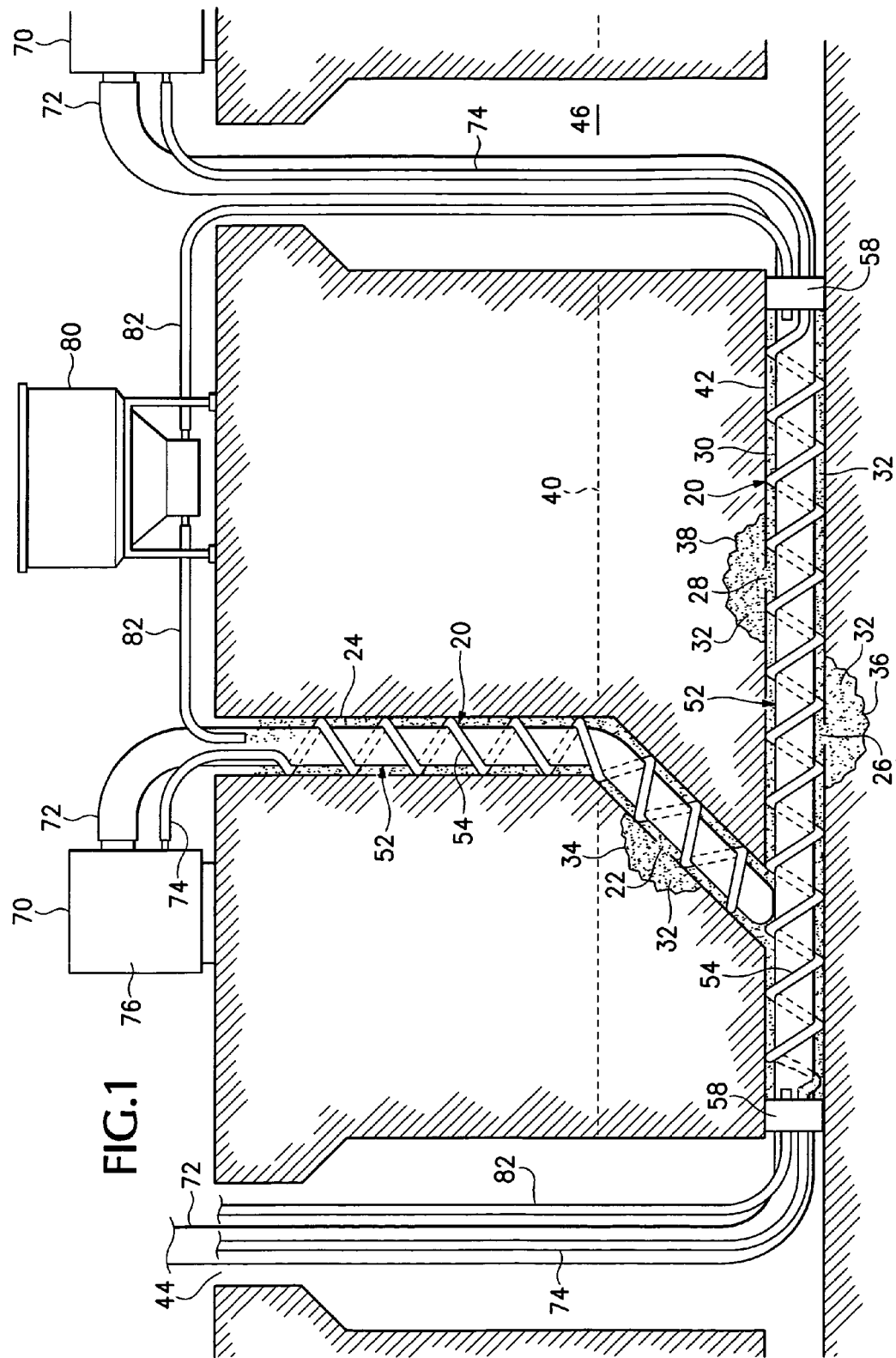
FIG. 1 is a simplified elevational section view of a portion of a sewer system in which a section of a defective underground conduit is undergoing repair in accordance with an embodiment of the method and using apparatus which is an embodiment of one aspect of the present invention.

Referring now to the drawings which form apart of the disclosure herein, in FIG. 1 a space filler or spacer system 20 is shown in use in an underground conduit system, to repair a defect 22 in a lateral feeder pipe 24 and defects 26 and 28 in a main trunk sewer pipe 30.

A quantity of a sealant material 32 is used to fill and plug holes and cracks in the walls of the lateral feeder pipe 24 and the main trunk pipe 30 and to at least partially fill voids 34, 36, and 38 which may have been formed in the soil around the underground conduits. Such voids may be formed as a result of water moving into the underground conduits through cracks or holes such as the defects 22, 26, and 28, particularly when such defects are located beneath the water table 40 or may be beneath a variable water table at certain times. Such voids 34, 36, and 38 may also be the result of water under pressure being forced out through defects in the underground conduit 24 or 30 at times, and thereafter flowing back into the underground conduits 24, 30, when internal pressure has decreased. The sealant material 32 may be any stable material that has the ability to change from a liquid to a solid by means of hydration, polymerization, or temperature reduction and that will remain a solid at the temperature of the surrounding soil, such as any of several well-known grout materials, or other materials such as those disclosed in U.S. Pat. No. 6,416,692 or U.S. Pat. No. 6,415,824.

Various grout materials are well known for use in sealing underground pipe systems. Some of these grout materials are based upon Portland cement and the like, while others are based on polymer solutions which cure after preparation to form film, gel, or foam of polyurethane, acrylamide polymers.

A selected portion of the underground conduit in need of repair, such as the segment 42 of the main trunk sewer pipe line 30 between the manhole 44 and the manhole 46, or such as substantially the entire length of the feeder lateral drainpipe 24, is substantially filled by installing a spacer system 20 where repair is to be effected. The spacer system 20 includes at least one inflatable flexible tubular bladder such as the large-diameter tubular bladder 52 shown in FIGS. 1 and 2. The spacer system 20 is placed within the selected portion of the underground conduit to be repaired so as to extend longitudinally therein and through all of the selected portion of the underground conduit to be repaired at one time. At least one additional spacer element, such as the small-diameter flexible tubular bladder 54, is preferably also placed within the portion 42 of the main trunk sewer pipe 30 or within the lateral feeder 24 and extends along the large bladder 52 over the length of the selected portion of the conduit to be repaired, creating a passageway for sealant material to flow along the selected portion of the conduit.

A special plug 58, which may be of a type shown in greater detail in FIGS. 11-14, is used to close and seal at least one end of the segment 42 of the main underground conduit 28 around the bladders 52 and 54. At the opposite end of the segment 42 of the underground conduit to be repaired, a simple plug (not shown) may be installed to close and seal the downstream end of the selected portion of the underground conduit where repair is to be affected, although another plug 58, as shown, may also be used. The plugs 58 must be of an appropriate size and shape to effectively close the underground conduit being repaired and to sustain pressure from within the filled feeder lateral pipe 24. The plugs 58 fit sealingly around the bladders 52 and 54 of the spacer system 20, so that the bladders can be filled and pressurized to fill the selected portion of the underground conduit at least halfway, and preferably nearly completely. Enough space must be maintained within the conduit, however, to permit movement of sealant material 32 along the underground conduit 24 or 30 and between the outer surfaces of the bladders 52 and 54 and the interior surfaces of the underground conduit 28.

Reservoirs 70, shown schematically in FIG. 1, may be utilized to supply an appropriate amount of fluid, such as air or water, under pressure and heated or chilled to a desired temperature, if necessary, and carried through hoses 72 and 74 to fill the bladders 52 and 54.

A reservoir 80, shown schematically in FIG. 1, may have an associated pump and heating equipment or other equipment necessary with respect to installing a particular sealant material 32. Hoses 82 extend from the reservoir 80 toward the upper end of the lateral pipe 24 and through the manhole trunk 46 to the plugs 58 with which the hoses 82 are sealingly connected, in order to deliver quantities of fluid sealant material 32 into the lateral pipe 24 and the segment 42 of the underground conduit where repair is to be effected. Using a fluid sealant such as a commonly available grout having a specific gravity of between 1.0 and about 1.5, gravity flow from that reservoir 80 located above ground level is effective to move the fluid sealant 32 to a required location.

The bladders 52 and 54 may be placed into a portion of an underground conduit 24 or 30 where repair is to be effected by use of conventional methods, such as eversion, or by pulling the bladders into the necessary portion of the conduit in a deflated condition.

Figure 2:
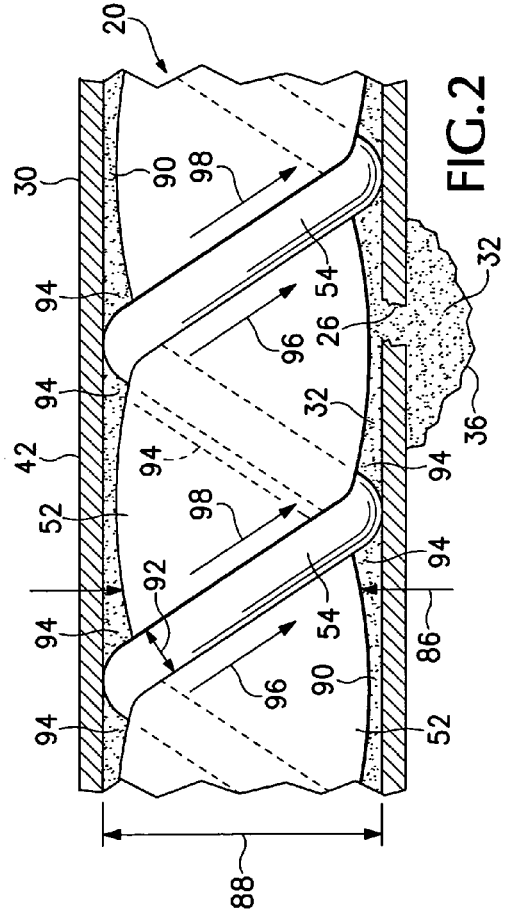
FIG. 2 is a sectional elevational view, at an enlarged scale, of a portion of the defective underground conduit shown in FIG. 1, showing use of apparatus according to an embodiment of the present invention to effect repair of the defective portion.

As shown in greater detail and at an enlarged scale in FIG. 2, the bladder 52 may have a diameter 86 similar to, that is, about equal to or slightly less than the diameter 88 of the portion 42 of the underground conduit 30, leaving an annular space 90. The smaller diameter tubular bladder 54 may be attached to the exterior of the bladder 52, extending helically around and along the bladder 52. Thus, when the bladders 52 and 54 are filled with a suitable fluid, i.e., inflated with air or another gas or liquid under pressure, the bladder 54, having a diameter 92 equal to, for example, about one sixth of the diameter 86, supports the larger bladder 52 in a central position within the portion 42 of the conduit 30 when the bladders 52 and 54 are filled to a great enough pressure.

This configuration of the bladders 52 and 54, when both are filled with fluid under pressure, provides a helical passageway 94 along each side of the smaller bladder 54, as shown by the arrows 96 and 98. Quantities of fluid sealant material 32 can travel through the passageway 94 and thus along the bladders 52 and 54 to fill the annular space 90 in the segment 42 of the underground conduit 30, when pressure is applied to the sealant material 32.

As shown in FIGS. 1 and 2, for the sake of clarity the size of the annular space 90 is exaggerated and the shape of the large bladder 52 is simplified. Preferably, the diameter 86 of the large bladder 52 when filled may closely approximate the diameter 88 of the interior of the selected segment 42 of underground conduit 30, but a helical passageway 94 will be defined along each side of the attached helically extending small diameter tubular bladder 54, allowing sealant material 32 in a fluid state to move longitudinally through the segment 42 of underground conduit 30.

When a quantity of fluid sealant material 32 reaches a defect such as the hole 26 extending through the wall of the underground conduit 30, as shown best in FIG. 2, some of the sealant material 32 will move through the hole 26 into the adjacent void 36. Sufficient quantities of sealant material 32 in a fluid condition must therefore be supplied through the supply hose 82 to allow for ample amounts of sealant material 32 to be forced outward into a void such as the void 36.

To prepare for installation of fluid sealant material 32 the bladders 52 and 54 are first installed. They may be pulled down, everted, or otherwise installed into the lateral connecting conduit 24, as through a clean-out hole near ground level, and thus through the entire length of such a lateral drain conduit 24 to its junction with the main trunk portion 30, to fill the entire length of the lateral drain conduit as shown in FIG. 1. Thereafter, bladders 52 and 54 can be installed in the selected portion 42 of the main trunk conduit 30 as, for example, from the manhole 46 to the manhole 44, thus extending past, and to some extent into contact with, the bladders 52 and 54 within the lateral drain conduit 24.

Once sealant material 32 is apparently not escaping in any significant quantity through defects 22, 26, and 28 and the like in the walls of the conduit into adjacent voids such as the voids 34, 36, and 38 shown in FIG. 1, the installation of additional sealant material 32 can be stopped. Pressure must be maintained within the bladders 52 and 54, however, to keep in place the sealing material already inside the underground conduit segments 42 and 24, so that it will remain where is needed for filling defects 22, 26, and 28 and other cracks or holes in the walls of the underground conduit being repaired, for a long enough time for the sealant material 32 to solidify and bond itself into the required position and configuration to seal the defects in the underground conduit permanently.

Thereafter, it is necessary to withdraw the bladders 52 and 54 of the spacer system 20 and to mechanically remove excess portions of the sealant material 32 that may have coated the interior of the conduits 24 and 30 that has been repaired, in order not to unduly restrict the flow capacity of the repaired conduits. Accordingly, it is desirable to provide a spacer system 20 including bladders such as the bladders 52 and 54 that nearly fill the interior of a conduit being repaired yet provide a passageway longitudinally through the conduit for delivery of sealant material in a fluid state to locations where it is needed to seal defects and fill adjacent voids.

To accomplish the desired sealing with a minimum waste of sealant material 32, then, it is desirable first to inflate the spacer system 20 such as the tubular bladders 52 and 54 within the selected portion 42 of an underground conduit 24 or 30 to be repaired, with sufficient pressure to fill the underground conduit nearly completely, and with a pressure greater than the pressure exerted by outside groundwater attempting to intrude into the conduit through the defects which are to be repaired. Then, with the smaller diameter tubular bladder 54 inflated with sufficient pressure to create passageways 94 along the smaller bladder 54, as shown best in FIG. 2, the sealant material 32 is forced into the conduit with pressure that should not ordinarily exceed that within the bladders 52 and 54, but in any case is greater than that of surrounding groundwater, so that the sealant material 32 is forced through the passageways 94 along the bladders 52 and 54 to proceed into the defects that are to be sealed.

Once enough sealant material 32 has been injected into the segment 42 of conduit being repaired, sealant material 32 will no longer flow out through defects 22, 26, and 28, and the like in significant amounts. After that time no additional sealant material 32 need be pumped into the selected portion 42 of the underground conduit, and it may be desirable to deflate or reduce somewhat the pressure in only the smaller bladder 54, allowing it to collapse to permit the larger bladder 52 to expand more closely toward the interior surfaces of the conduit, to minimize the amount of excess sealant material 32 retained within the conduit and force additional quantities of the sealing material into the voids 34, 36, 38, etc., which may exist adjacent to portions of the underground conduit 30.

Instead of a single large diameter bladder 52 and a smaller bladder 54 helically arranged about and attached to the bladder 52 as a spacer system 20 to permit repair of leaking defects in an underground conduit with a minimum of wasted sealing material, other configurations are also workable.

Figure 3:
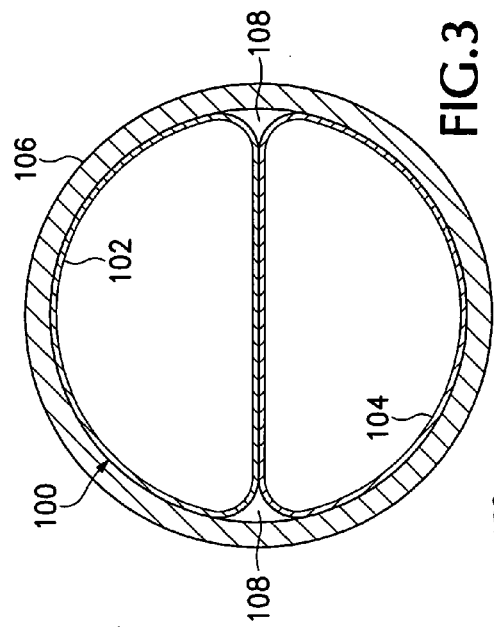
FIG. 3 is a transverse sectional view of an underground conduit with a spacer system installed to permit installation of sealing material within the conduit according to one embodiment of the invention.

For example, as shown in section view in FIG. 3, a spacer system 100 including a pair of flexible bladders 102, 104 both of similar size can be installed alongside each other within in underground conduit 106. The two bladders 102 and 104 could, if desired, be placed into the conduit 106 together. Alternatively, the bladder 102 can be everted into the selected portion of the conduit 106, then allowed to collapse by relieving pressure on the air or other fluid inside the bladder 102, after which the bladder 104 can also be everted into the selected portion of the conduit 106 alongside the bladder 102, and both bladders 102 and 104 can then be filled to a desired pressure. With both of the bladders 102 and 104 filled at least approximately equally, and depending somewhat upon the amount of elasticity of each of the bladders 102 and 104, a pair of bladders each having an actual circumference in the range of about three-quarters to slightly less than or about equal to four fifths of the interior circumference of a circular conduit will nearly fill the interior of the conduit, as do the bladders 102 and 104 in FIG. 3. That is, subtracting the portions of the circumferences of the bladders 102 and 104 that confront each other, the total of the circumferences of the two bladders is equal to or slightly less than the interior circumference of the conduit 106.

While the bladders 102 and 104 conform substantially to the shape of the interior surfaces of the conduit 106, where the bladders 102 and 104 confront and lie alongside each other, a pair of passageways 108 are defined between the bladders 102 and 104. The passageways 108 extend longitudinally along the interior surfaces of the conduit 106, and serve to conduct fluid sealant material 32 along the interior of the portion of an underground conduit 106 where the tubular bladders 102 and 104 are present. Sealant material 32 should be forced between the bladders and the interior well surfaces of the portion of the conduit 106 being repaired at a pressure greater than the greatest pressure of groundwater surrounding the conduit 106, so that the fluid sealant material 32 will find its way longitudinally along the conduit 106 through the passageways 108. Where a defect in the wall of the conduit 106 is open or there is a void outside the conduit 106 adjacent such a defect, the sealant material 32 will find its way alongside the bladders 102 and 104 and into and through the defect in the wall of the conduit, filling the adjacent external voids and eventually filling the defects in the walls of the conduit. As with the spacer system 20 described previously, once sealant material is installed the bladders 102 and 104 are kept filled and pressurized while sealant material at least partially solidifies or cures, after which the bladders 102 and 104 are removed from the conduit 106 and excess sealant is removed.

Figure 4:
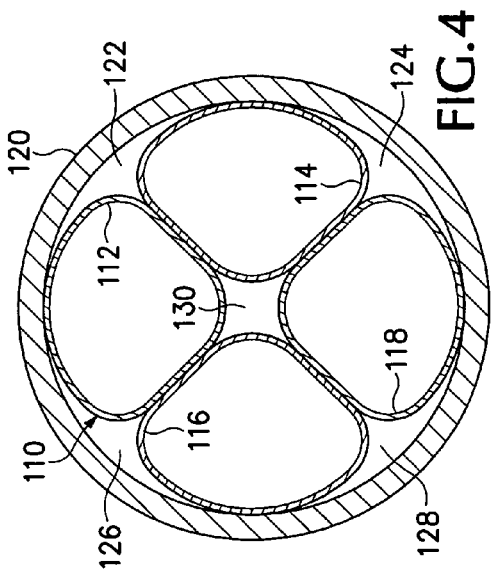
FIG. 4 is a transverse sectional view of an underground conduit in which a space-filling system according to another embodiment of the present invention is installed in order to permit installation of sealing material within the conduit according to a method embodying the present invention.
Figure 6:
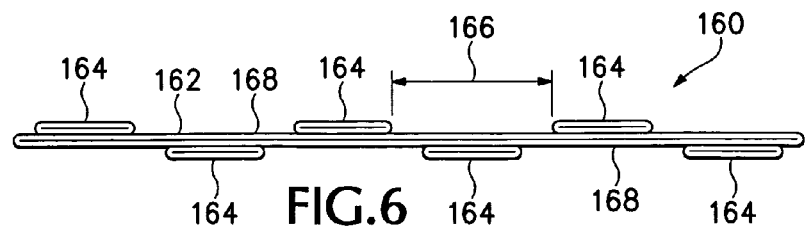
FIG. 6 is an end view of a space-filling bladder system according to an embodiment of the present invention, including small elongated bladders attached to the outside of a larger elongated bladder, shown collapsed to a flat condition.
Figure 7:
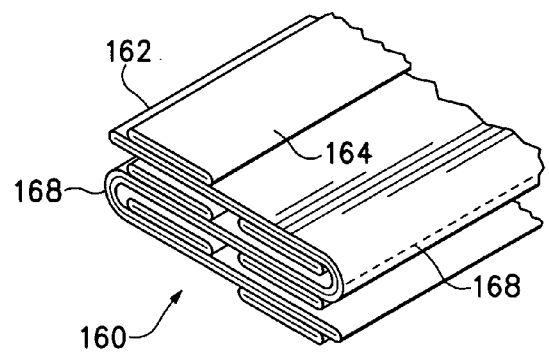
FIG. 7 is an isometric view of from an end of a space-filling bladder system similar to that shown in FIG. 6, with the large, central bladder folded along a pair of parallel longitudinal fold lines into a more compact configuration than that shown in FIG. 6.

As shown in FIG. 4, a spacer system 110 including a greater number of somewhat smaller tubular bladders may be used to fill nearly the entire space within a conduit into which sealant material is to be injected to fill voids and defects in the walls of the conduit. Thus four tubular bladders 112, 114, 116, and 118 are shown within a conduit 120, where they cooperatively define, when under pressure, passageways 122, 124, 126, and 128 extending along the conduit 120 between adjacent ones of the bladders and along the interior surface of the wall of the conduit 120, and may define a central passageway 130 where the four bladders all meet one another. The spacer system 110 is also used in a manner similar to use of the spacer systems 20 and 100, and it will be understood that the four bladders could actually be parts of the same tubular bladder, folded over and with parts alongside one another in the selected portion of the conduit 120.

Figure 5:
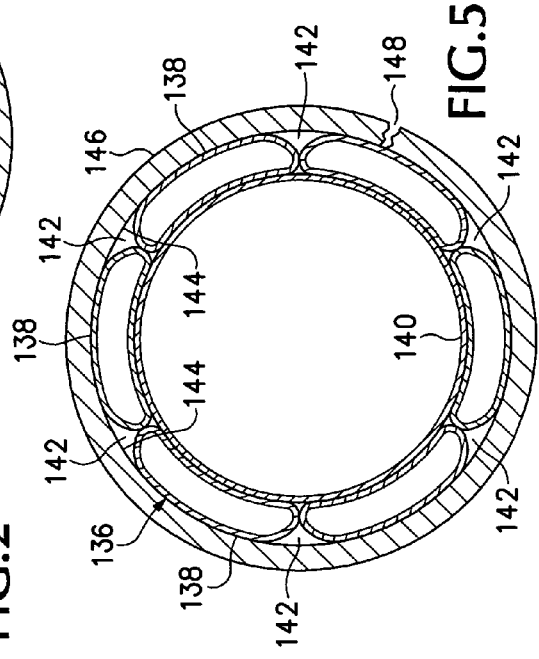
FIG. 5 is transverse sectional view of an underground conduit in which there is a space-filling system according to yet another embodiment of the present invention, including a large inflated bladder and six smaller inflated bladders attached to the large inflated bladder.

As shown in FIG. 5, in a slightly different spacer system 136, several smaller bladders 138 may be attached to the exterior of a larger bladder 140, with the smaller bladders 138 all extending parallel with one another along the exterior of the larger bladder 140, so that when all of the bladders 138 and 140 are filled with fluid under pressure as shown in section view in FIG. 5, the spacer system 136 substantially fills the interior space within the conduit 146, yet provides passageways 142 through which fluid sealant material 32 can flow along the smaller bladders and the interior surface 144 of the wall of a conduit 146. Such passageways 142 extending continuously along the length of the conduit 146 permit flow of an ample quantity of sealant material 32 along the portion of the conduit 146 to be repaired in one repair operation, without requiring sealant material to find a path extending undesirably far circumferentially from one of the passageways 142 to a defect such as a crack 148 in the wall of the conduit.

Referring to FIGS. 6, 7, 8, 9, and 10, a spacer system 160 also embodying an aspect of the invention includes a large tubular bladder 162 and several, for example six, significantly smaller tubular bladders 164, preferably similar to each other, and with each of the smaller tubular bladders attached to the exterior of the larger bladder 162. At least some space 166 is preferably provided between adjacent ones of the smaller bladders 164 when all the bladders 162 and 164 are in a collapsed, flattened condition, as shown in end view in FIG. 6. The spacer system 160 can be installed by everting it into a conduit 174, inflating only the large bladder 162 during the process. Alternatively the spacer system 160 can be folded along longitudinally extending folds 168 to a more compact, narrower folded configuration such as that shown in FIG. 7, to facilitate pulling the spacer system 160 through the interior of a conduit 174 that is to be repaired using the spacer system shown. For example, for use in a conduit 174 having an inside diameter of 8 inches, a nominal 8-inch lay flat hose may be used as the bladder 162 and nominal 1-inch lay flat hose may be used as each of the six smaller tubular bladders 164.

Figure 8:
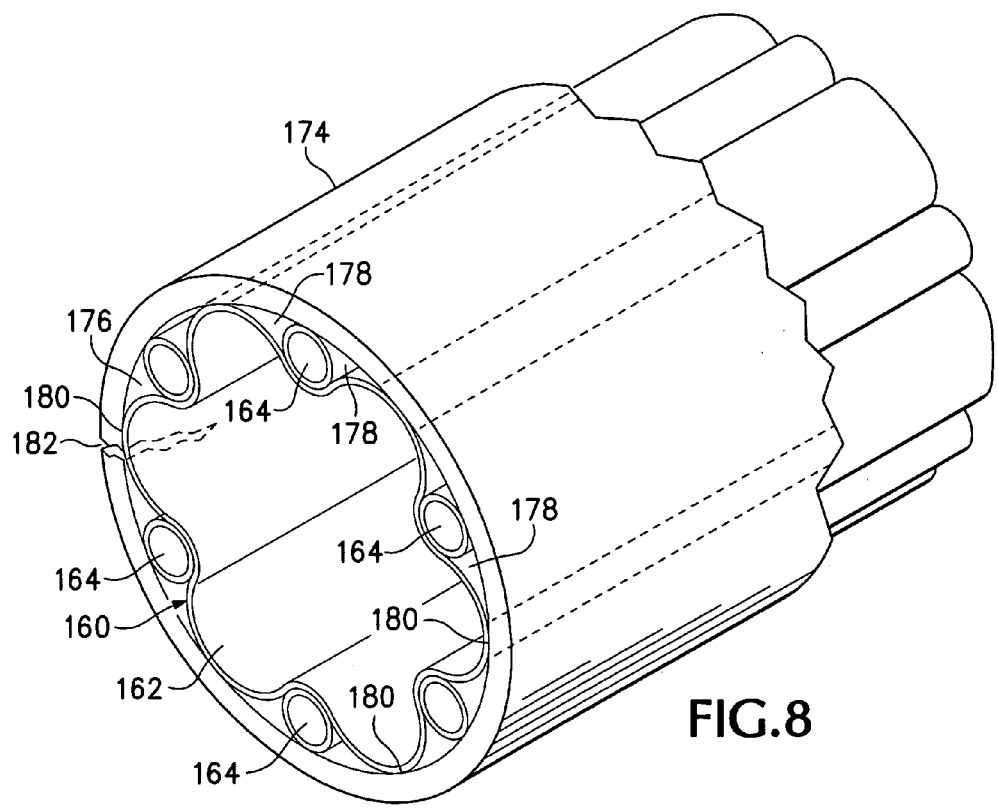
FIG. 8 is an isometric view of a section of an underground conduit cut on a transverse plane, with a space-filling system similar to those shown in FIGS. 6 and 7 installed and filled with fluid to a condition providing passageways extending longitudinally within the conduit to permit installation of sealant material within the conduit.

Once the spacer system has been placed within a length of conduit 174 that is to be repaired, as shown in FIG. 8 the large bladder 162 may be filled with a fluid under a pressure such as 10 psi., at least equal to the pressure of surrounding groundwater. While sealant material 32 is being introduced the smaller diameter bladders 164 may be fully filled with fluid as shown in FIG. 8, under a pressure equal to or greater than the pressure used to inflate the large diameter bladder 162. The large diameter bladder is held away from contact with most of the interior surfaces 176 of the selected portion of the conduit 174 that is to be repaired, forming narrow passageways 178 extending longitudinally along each side of each of the smaller diameter bladders 164, between the large diameter bladder 162, the interior surface 176 of the conduit 174, and the exterior surface of the small diameter bladder 164. Intermediate portions 180 of the large diameter bladder 162 may rest against and in contact with interior surfaces 176 of the wall of the conduit 174.

Figure 9:
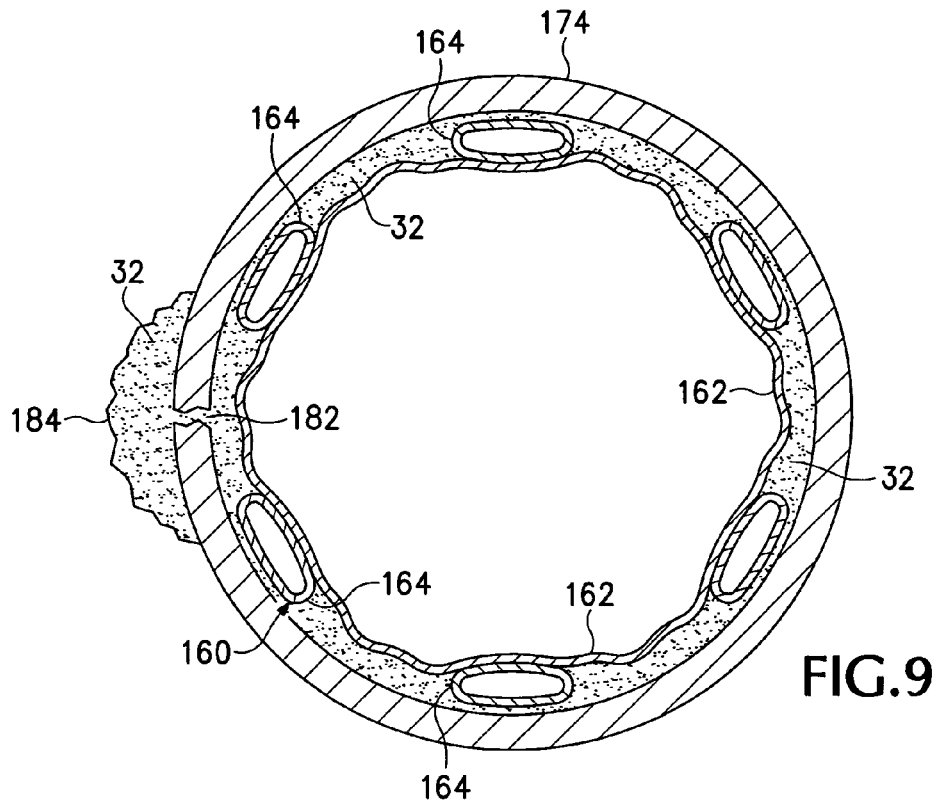
FIG. 9 is a sectional view on a transverse plane through a section of an underground conduit together with a space filling system similar to that shown in FIG. 8, but showing the space-filling system in a different condition of inflation, and with a quantity of sealing material in the underground conduit.
Figure 10:
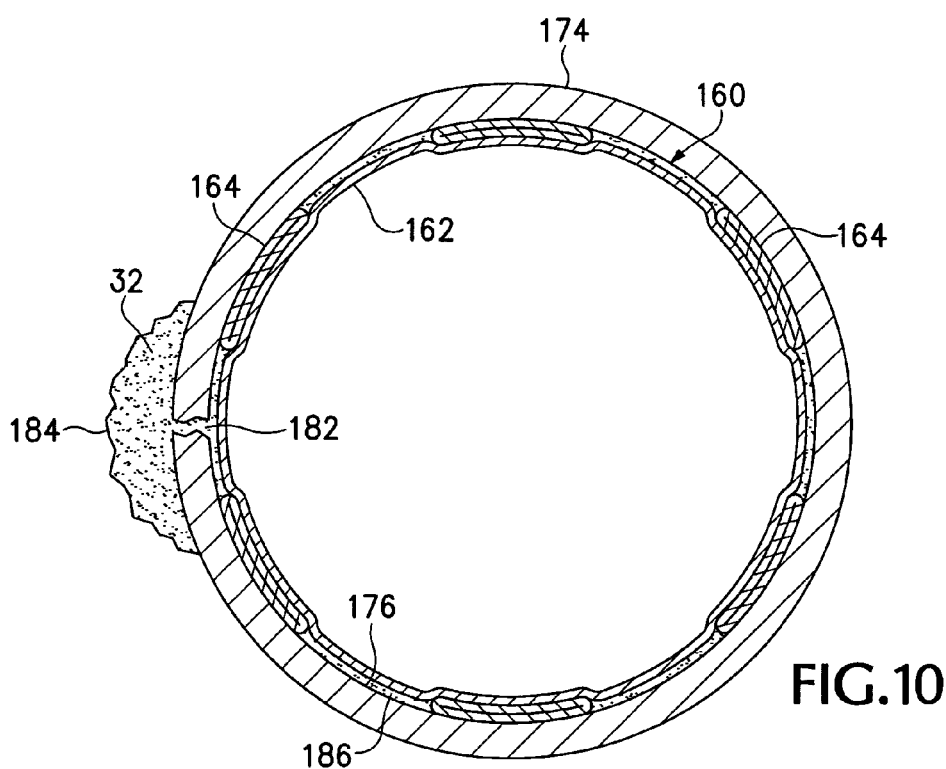
FIG. 10 is a view similar to FIG. 9, showing the space filling system occupying more of the space within the underground conduit.

With the smaller bladders 164 all fully filled as shown in FIG. 8, required quantities of fluid sealant material 32 can be forced into the underground conduit 174 from an end of a selected portion of the conduit and delivered to locations along the conduit 174 where a defect 182 may be located and an exterior void 184 may be located adjacent the exterior surfaces of the conduit 174, as shown in FIGS. 9 and 10. After insertion and delivery of sealant material 32 along the passageways 178, sealant material 32 may be further distributed and forced into defects 182 which may be located between the smaller bladders 164, by reducing the pressure within the bladders to permit them to collapse partially, allowing the bladders to approach the configuration shown in FIG. 9.

Once it has been determined that a sufficient quantity of sealant material 32 has been installed between the bladders of the spacer system 160 and the interior surfaces 176 of the wall of the conduit 174, pressure within each of the smaller diameter bladders 164 may further be reduced, while pressure is maintained or increased within the larger bladder 162. This urges the larger bladder 162 closer and more evenly toward the interior surfaces 176 of the conduit 174, forcing available excess sealant material 32 out through the defects 182 and the like in the wall of the conduit 174, as shown in FIG. 10, while reducing the thickness of a layer 186 of sealant material 32 extending along the interior surfaces 176 of the conduit 174 in other locations. Pressure is then maintained within the large bladder 162 throughout the time necessary to permit the sealant material 32 to set and solidify adequately to seal the defects 182 and fill the voids 184. The large bladder 162 can then also be deflated, to permit removal of the spacer system 160 and eventual mechanical removal of excess sealant material 32 from the interior surfaces 176 of the portion of the conduit 174 that has been repaired.

Various materials can be used for the various tubular bladders for the spacer systems such as the spacer system 20, 100, 110 or 160, including flexible hoses made of material derived from combination of polymers or latex and possibly reinforced with fabric or scrim to prohibit expansion of circumference and length. Bladders may be constructed with a seam that is either stitched, welded or both or may be made without a seam by extrusion. Tubes and bladders used in the cured-in-place pipe repair industry known as pre-liners and calibration tubes are made in the same way and may be utilized as bladders. One such tube is made of soft PVC, which may be extruded in various sizes. A flexible fiber-reinforced hose known as "lay-flat" or "discharge hose," which is thin-walled, quite flexible, and available in practically in any desired length and in diameters up to at least 16 inches may also be used for bladders. Such hose is usually made with a PVC tube and cover co-extruded with a polyester yarn reinforcement web and is capable of withstanding the pressures needed, greater than about 5 pounds per square inch, in connection with repair of most underground conduits in accordance with the methods described herein, depending on the depth and ambient external groundwater head. The tubular bladders 162, 164 may be of inelastic material or the reinforcement web such as in a lay-flat hose keeps the bladders from expanding excessively under the pressure used, so that a space is preserved as described for movement of fluid sealant material 32.

The smaller-diameter tubular bladders are preferably attached to the larger-diameter tubular bladders by sonic or thermal welding, or can also be attached by chemical adhesive, depending upon the materials of the tubular bladders.

Instead of using one or more tubular bladders of smaller diameter in combination with a larger bladder, a small-diameter hose of stiffer construction than that of the larger diameter bladder might also be used as a spacer alongside a large-diameter tubular bladder to create a passageway for fluid sealant material along the large diameter bladder within a conduit to be repaired. Alternatively, a stiff yet flexible rod of fiber-reinforced plastic resin may be placed into an underground conduit in a helical arrangement along the interior surfaces of the conduit, where the rod will press against the interior surfaces as a result of its own shape-restoring elastic forces. With the rod (not shown) thus in place it acts similarly to the small bladder 54 shown in FIGS. 1 and 2 when a tubular bladder is everted into the conduit, as the bladder will extend along the conduit within the helical coil of the rod. Rods of a satisfactory sort in various sizes are available as duct rodders, from Condux International, Inc., of Mankato, Minn.

Figure 11:
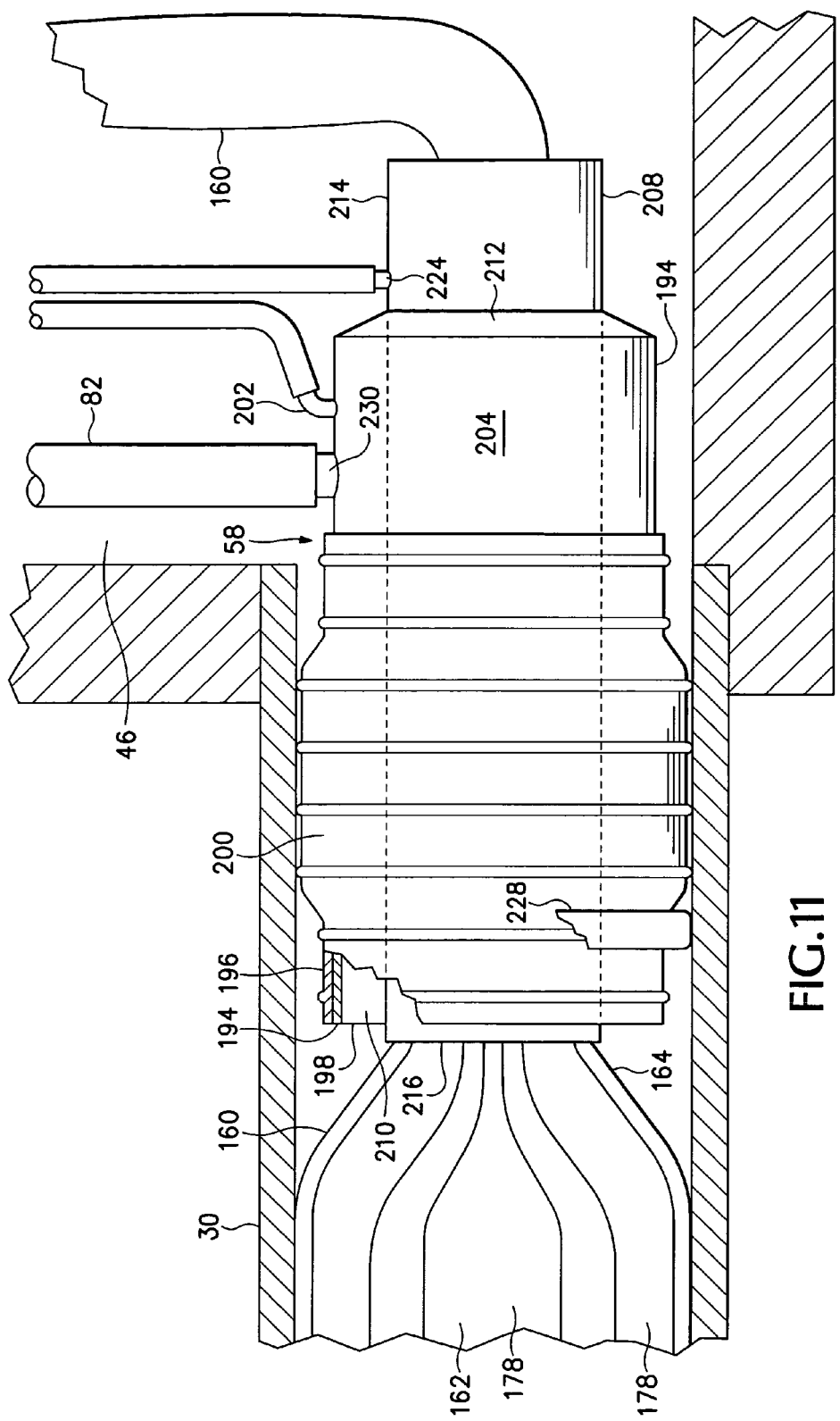
FIG. 11 is a simplified elevational section view of a portion of a manhole and a portion of underground conduit in which a special plug is installed to isolate a selected section of the conduit and permit a spacer system to be installed and inflated.

The special plug 58 shown in FIG. 1 is shown greatly enlarged in FIG. 11, where it is shown installed in the main trunk conduit 30 at the manhole 46. A pipe-like outer tubular shell or cylinder 194 of the plug 58 carries a sleeve 196 which may be of rubber or another suitably strong, flexible, and elastic material, mounted on an inner end portion 198 of the cylinder 194. The sleeve 196 includes an inflatable bladder portion 200 that normally extends snugly around the outer cylinder 194 and expands radially to a configuration such as that shown in FIG. 11 when inflated by pressurized air communicated to the bladder 200 by an air pipe 202 fitted to the outer end portion 204 of the outer cylinder 194 as shown in FIG. 12. Such a sleeve 196 is available as part of a plug marketed by Plugit Products of Lockeford, Calif., as its "Series 280" plug. The air pipe 202 may be connected with the bladder 200 through an air connection on the inner side of the bladder 200 and an appropriate opening provided through the outer cylinder 194 to accommodate that connection with an inner end of the air pipe 202, within the outer cylinder 194, as shown in FIG. 12. Other ways of interconnecting the bladder 200 with the air pipe 202 could also be used.

The outer cylinder 194 may be of a size somewhat smaller than the interior of the main trunk conduit 30, but large enough so that when the bladder 200 is inflated it expands radially into contact with and presses sealingly against the interior surfaces of the conduit 30 as an outer seal.

A tubular inner shell or cylinder 208 is smaller in diameter than the outer shell or cylinder 194 by an amount sufficient to leave a radial gap or annular space 210, between the interior of the outer cylinder 194 and the exterior surface of the inner cylinder 208. The annular space 210 is large enough to allow fluid sealant material 32 to flow easily between the outer cylinder 194 and the inner cylinder 208. At the outer end 204 of the outer cylinder 194 the annular space 210 is closed and the outer cylinder 194 and inner cylinder 208 are connected securely together, as by an end closure 212 welded in place or otherwise solidly interconnecting the outer cylinder 194 with the inner cylinder 208 and securely holding the two shells or cylinders 194 and 208 located concentrically and coaxial with each other.

The outer end 214 of the inner cylinder 208 may extend at least a few inches beyond the outer end 204 of the outer cylinder 194, while an inner end 216 may extend at least about as far as the inner end 198 of the outer cylinder 194 and may extend beyond the inner end 198 by a few inches.

Within the interior of the inner cylinder 208 is mounted an annular controllable closure fitting 220 including an inflatable bladder 222 interconnected with an air pipe 224 and functioning as a sphincter. When relaxed the fitting 220 provides a clear central opening 226 through the interior of the inner cylinder 208, as shown in FIG. 13A, where the bladders 162 and 164 of the spacer system 160 are shown in the opening 226. With a small amount of air pressure provided to the bladder 222 through the air pipe 224 the bladder 222 inflates and extends inwardly as shown in FIG. 13B, decreasing the size of the opening 226, and when pressure within the bladder 222 is further increased it expands inwardly to close the opening 226 tightly around the spacer system 160 as an inner seal, as shown in FIG. 13C. Such a fitting 220 is available as part of a plug available from Plugit Products of Lockeford, Calif.

Thus, when a spacer system such as the spacer system 20 including the bladders 52 and 54, or, as shown in FIGS. 11-14, when the spacer system 160 shown in FIGS. 6, 7, 8, 9, and 10 is extended through the special plug 58, it is free to pass through the central opening 226 in the fitting 220 when pressure is relieved from the bladder 222, and when the bladders 162 and 164 of the spacer system 160 have been positioned as desired within the conduit 30 and inflated, pressure can be provided to the bladder 222 through the air pipe 224 to inflate the bladder 222 and close the fitting 220 around the spacer system 160 within the special plug 58. Pressure applied to the bladder 222 can be adjusted as necessary to relax it, to permit adjustment through the central opening 226 of the pressure on fluid filling the bladders 162 and 164 to the desired pressure.

With the special plug 58 in place as shown in FIG. 12, and with the bladders 200 and 222 inflated as shown in FIG. 12, the special plug 58 closes the underground conduit 30 to isolate the selected segment 42 of the conduit 30. To assist in maintaining a fully tight closure, it may be desirable to provide a quantity of a pliable sealant, such as a quantity of plumber's putty 228 or a similar flexible compound in the space between the spacer system 160 and the inner bladders 222, within the annular fitting 220, as shown in FIGS. 12, 13C and 14.

A pipe 230 is attached to and extends away from the outer cylinder 194 and communicates with the annular space 210 through a corresponding hole through the outer cylinder 194 to receive fluid sealant material 32 from the reservoir 80 through the hose 82. The annular space 210 permits the fluid sealant material 32 to proceed as indicated by the arrows 232 between the outer end portion 204 of the outer cylinder 194 and the outer end 214 of the inner cylinder 208 so that the fluid sealant material 32 can proceed freely along the spacer system 160 on top, bottom, and all sides, through the passageways 178 defined alongside the smaller bladders 164, explained above in connection with description of the spacer system 160 and FIGS. 6-10.

In situations where fluid sealant material 32 may be required in a location along the length of a selected section of a conduit to be repaired but there is a concern that the fluid sealant may not move to the required location as readily as desired, or when it is desired to assist in movement of excess fluid sealant material along the length of a selected portion of a conduit to be repaired, as shown in FIG. 15 a rope 240 attached to a flexible pig or swab 242 may be provided within the interior of the main bladder, such as tubular bladder 162 in the spacer system 160, so that the pig 242 can be pulled through the interior of the tubular bladder 162, to urge the tubular bladder radially outwardly toward the interior surfaces of the wall of the conduit being repaired. The pig 242 acts thus as a piston being pulled through the tubular bladder 162 and urges available fluid sealant material 32 ahead of it as a pool 244, as shown in FIG. 15. Thus in difficult situations a backup means is available for urging the fluid sealant material 32 from the location of the special plug 58 toward the opposite end of a section of conduit to be repaired. Such a pig 242 or swab in one suitable form is constructed of polyurethane foam, and is known previously for use in connection with cleanout and servicing of pipelines. One suitable such pig is available from Knapp Polly Pig, Inc., Of Houston, Tex.

In repair of some underground conduits it may be necessary to fill one or more large voids 36 located on one side or the bottom of a selected portion of the underground conduit 30. In such a situation the quantity of sealant material 32 required on that side of the spacer system 160 may be greater than the amount flowing through a passageway 178 on that side of a tubular bladder spacer system 160. Use of sufficient pressure to urge fluid sealant material 32 into a conduit 30 alongside a spacer system 20, 100, 136, or 160 should ordinarily be successful in making it fluid sealant material 32 available wherever needed along a portion of a conduit being repaired. However, flow of sealant material 32 in a circumferential direction around a spacer system and within the conduit can be augmented or facilitated by slightly constricting the tubular bladders at locations 250, 252 spaced apart by a selected distance 254 along the length of the spacer system, as shown in FIG. 16. This may be accomplished simply by wrapping the spacer system to a circumference slightly smaller than the interior size of the conduit at selected locations 250, 252 with constricting bands such as loops of adhesive fiber-reinforced packaging tape 256, or by placing a loop or belt of other non-elastic flexible material around the set of tubular bladders of the spacer system or around at least the largest bladder of a spacer system, prior to installation of the bladders in the conduit 30 to be repaired. When the bladders are filled within the conduit the slightly constricted portions provide circumferential passageways 258 for flow of sealant material 32 as illustrated by the arrows 260 in FIG. 16 to help distribute sealant material where needed to fill a void 36.

As an alternative to constricting the bladders of a spacer system, as shown in simplified form in FIGS. 17A, B and C, an elongate rod 262 as mentioned above, instead of being installed in a helical arrangement may be provided with a plurality of hoops 264, formed of flexible slender material similar to that of the rod 262 itself, in a size to fit tightly against the inside surface of a conduit 266 attached to the rod at apart spaced locations, as by wrappings 268 of flexible strong adhesive tape or other suitable fastenings such as wires. As the rod 262 is inserted into and along the conduit, the hoops 264 can drag back and become somewhat narrowed and elongated as shown in FIG. 17A. By moving the rod 262 backward a short distance, in the direction of the arrow 270 of FIG. 17B, after it has been inserted fully into the conduit 266, the hoops 264 can be tilted into position generally transverse to the rod 262 and circumferential of the conduit 266 as shown in solid line in FIGS. 17B and 17C. Longitudinal passageways 272 are formed along the rod 262 and circumferential passageways 274 are formed alongside each hoop 264 when the tubular bladder 276 is filled in the conduit and encircled by the hoops.

Referring now to FIGS. 18, 19, and 20, a spacer system 280 is shown in place in the underground conduit 174 also shown in FIGS. 8, 9, and 10. In the spacer system 280, a flexible tubular bladder in the position of an outer tube 282 is located within the conduit 174, where it is initially located adjacent the interior surfaces 176 of the conduit 174. Within the outer tube 282 is a system which may include a large flexible tubular bladder 162 and several small flexible tubular bladders 164, which may be of the same or similar construction as in the spacer system 160 described above in connection with FIGS. 6-10.

As the spacer system 280 is shown in FIG. 18, the smaller bladders 164 are inflated fully and hold the larger bladder 162 away from contact with the outer tube 282 except along contact areas 284 between the small bladders 164. As shown in FIG. 18, the configuration of the spacer system 280 is somewhat idealized, and in actuality there may be some compression of the small bladders 164 and the large bladder 162 may not extend completely into contact with the outer tube as neatly as is shown in FIG. 18, depending upon the relative sizes of the actual bladder 162 and the interior of the conduit 174. This may be the configuration of the spacer system 280 when it has just been installed into the conduit 174. Installation may be accomplished by first everting the outer tube 282 into place within the conduit 174, after which the bladders 162 and 164 may be everted within the outer tube 282 in a manner similar to that which may be used to install the spacer system 160, as described above with respect to FIGS. 6-10.

Once the spacer system 280 has been installed within the conduit 174, sealant material 32 may be installed in generally the same manner described above, as, for example, by use of a special plug 58, with the sealant material 32 being installed between the outer tube 282 and the interior surfaces 176 of the conduit 174. The material used for the outer tube 282 may be stretchable to conform to the exterior surfaces of the bladders 162 and 164, generally as shown in FIG. 19, leaving passageways 286 shaped by adjacent ones of the bladders 164 and located between the outer tube 282 and the interior surfaces 176 of the conduit 174, as shown in FIG. 19. A great majority of the interior space within the conduit 174 is thus occupied by the spacer system 280, while an annular space surrounding the spacer system 280 contains the sealant material 32 and directs it toward defects in the conduit 174 such as the crack or opening 182, so that the sealant material 32 can proceed outward through the defect 182 into the adjacent void 184 alongside the conduit 174.

Once the required amount of the sealant material 32 has been introduced within the interior of the conduit 174 and surrounding the spacer system 280, the spacer system 280 may be inflated to more fully occupy the interior space within the conduit 174, as shown in FIG. 20, by deflating the smaller bladders 164 and more fully inflating the large bladder 162. Ideally, it would be desirable for the residual amount of sealant material 32 to be a minimum, as depicted in FIG. 20, once the sealant material 32 has been installed in a selected portion of the conduit 174. At least a small quantity of the sealant material 32 will unavoidably remain between the exterior surfaces of the outer tube 282 and the interior surfaces 176 of the conduit 174, as shown in FIG. 20. Once the sealant material 32 has sufficiently solidified or cured the spacer system 280 may be removed from the conduit 174 by first inverting and removing the combined large bladder 162 and smaller bladders 164 while the outer tube 282 is left in place. Thereafter the outer tube 282 may be removed by inverting it and removing it from the conduit 174 in a reversal of the initial installation process. By inverting the outer tube 282 as part of the removal procedure, the removal of the outer tube 282 brings any sealant material 32 that adheres to the outer surface of the outer tube 282 into the interior of the inverted outer tube 282, thus removing at least some of the excess sealant material 32 from the conduit 174 in a neatly contained manner permitting relatively easy disposal.

The outer tube 282 may be of an extruded polymeric plastic film with sufficient strength, flexibility, and ability to be stretched without failure, so that it can freely conform to the exterior surfaces of the bladders 162 and 164 as described above. For example, the outer tube 282 may, in one configuration, be made of low density polyethylene tubing having a wall thickness 288 in the range of 2-14 mils, for use in a conduit 174 having an interior diameter of, for example, 8 inches. A greater wall thickness and lower density polyethylene film may be used where the outer tube 282 will be required to stretch significantly to conform to the bladders 162 and 164, and greater strength of the material may be desired where the outer tube 282 will have to be removed by inverting it from a long section of a conduit 174.

The outer tube 282 may, for example, be installed in the conduit 174 by everting it into the desired segment of the conduit 174 and then leaving an inside-out portion of the same of the outer tube material within the everted outer tube 282 over the entire length of the selected segment of the conduit 174. Thereafter the bladders 162 and 164 may be everted into the selected section of the conduit 174 with a portion of inside-out bladder combination similarly left within the everted length of the bladder system to be used upon completion of installation of the sealant material 32 to retract and invert the bladders 162 and 164 as a unit. By virtue of the outer tube 282 the combination of bladders 162 and 164 can be removed substantially free of sealant material 32 so that only a minimum amount of cleaning is necessary before reuse of the bladders 162 and 164 in a subsequent section of a conduit of the same size.

By comparison with the system of combined bladders 162 and 164 the outer tube 282 is very inexpensive, and because of the difficulty of cleaning the outer tube 282 after it has been removed from the conduit 174 it may be more practical and economical to discard the outer tube 282 after each section of an underground conduit has been repaired by use of the spacer system 280 described above.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A spacer system for use in repairing a defect in an underground conduit, comprising:
   (a) a plurality of flexible tubes, arranged to be installed and filled with fluid alongside one another and to extend longitudinally within a selected portion of said underground conduit where repair is to be made;
   (b) plugs capable of closing the ends of said selected portion of said conduit while said flexible tubes are located therein in a fluid-filled condition; and
   (c) a fitting communicating with an interior of said selected portion of said conduit externally of said flexible tubes, said fitting including an inlet for a fluid sealant material.

2. The spacer system of claim 1 wherein each said flexible tube when filled with a fluid has an exterior size no larger than about equal to an interior size of the underground conduit.

3. The spacer system of claim 1 wherein said plurality of flexible tubes consists of at least two said flexible tubes, large enough when alongside each other to occupy jointly a majority of said interior of said selected portion of said conduit.

4. The spacer system of claim 3 wherein said flexible tubes are of similar sizes, having a combined total circumference no greater than about equal to an interior circumference of said conduit, when mutual contact area between the tubes is discounted.

5. A spacer system for use in repair of a selected portion of an underground conduit having a predetermined length and a predetermined transverse interior dimension, comprising:
   (a) a first flexible tubular bladder having a first exterior transverse dimension related to said internal transverse dimension portion of a conduit and having a bladder length at least as great as said predetermined length of said selected portion of said conduit;
   (b) at least one smaller flexible tubular bladder having a second exterior transverse dimension significantly smaller than said first exterior transverse dimension of said first bladder, said smaller bladder extending alongside and in contact with an exterior surface of said first flexible tubular bladder over at least a portion of said first flexible tubular bladder at least as long as said predetermined length of said selected portion of said conduit, said first flexible tubular bladder and said smaller flexible tubular bladder cooperatively at least partly defining a passageway extending longitudinally along said first bladder and said smaller bladder where said smaller bladder is located alongside and in contact with said exterior surface of said first bladder.

6. The spacer system of claim 5 wherein said smaller flexible tubular bladder extends helically around and along said first flexible tubular bladder over substantially all of said predetermined length of said selected portion of a conduit to be repaired.

7. The spacer system of claim 6 wherein said smaller flexible tubular bladder is adhered to said first tubular bladder.

8. The spacer system of claim 5 wherein said smaller flexible tubular bladder is adhered to said first inflatable bladder along substantially all of a portion of said first flexible tubular bladder at least as long as said predetermined length said selected portion of said conduit.

9. The spacer system of claim 5 including a plurality of said smaller flexible tubular bladders each having a respective external transverse dimension substantially smaller than said first external transverse dimension, each of said smaller flexible tubular bladders extending along and being adhered to said first flexible tubular bladder.

10. The spacer system of claim 9 wherein all of said plurality of smaller flexible tubular bladders are welded to said first bladder and spaced apart from one another circumferentially about said first flexible tubular bladder.

11. The spacer system of claim 9 wherein said first bladder and all of said smaller bladders are collapsed and said first bladder is folded along longitudinal folds into a compact configuration for installation.

12. The spacer system of claim 5 including an outer tube of thin flexible film surrounding said first tubular bladder and said at least one smaller tubular bladder and thus located so as to be able to isolate said first and smaller tubular bladders from contact with an interior surface of said selected portion of said conduit.

13. A spacer system for use in repair of a selected portion of an underground conduit, comprising:
   (a) a first flexible tubular bladder having a first exterior transverse dimension similar to a corresponding internal transverse dimension of a selected portion of a conduit and having a bladder length at least as great as a length of said selected portion of said conduit to be repaired;
   (b) at least one elongate rod having a second exterior transverse dimension significantly smaller than said first exterior transverse dimension of said first flexible tubular bladder, said elongate rod extending within said selected portion of said conduit alongside and in contact with an exterior of said first flexible tubular bladder and along substantially all of said length of said selected portion of said conduit, but free from attachment to said first flexible tubular bladder said first flexible tubular bladder and said elongate rod cooperatively at least partly defining a passageway extending longitudinally along and within said selected portion of said conduit.

14. A spacer system for use in repair of a selected portion of an underground conduit, comprising:
   (a) a first flexible tubular bladder having a first exterior transverse dimension similar to a corresponding internal transverse dimension of a selected portion of a conduit and having a bladder length at least as great as a length of said selected portion of said conduit to be repaired;
   (b) at least one elongate spacer having a second exterior transverse dimension significantly smaller than said first exterior transverse dimension of said first flexible tubular bladder, said elongate spacer extending within said selected portion of said conduit alongside and in contact with an exterior of said first flexible tubular bladder and along substantially all of said length of said selected portion of said conduit, said first flexible tubular bladder and said elongate spacer cooperatively at least partly defining a passageway extending longitudinally along and within said selected portion of said conduit; and
   (c) a plurality of constricting bands extending around said first flexible tubular bladder at respective locations spaced apart longitudinally along said first flexible tubular bladder.

15. A spacer system for use in repair of a selected portion of an underground conduit, comprising:

(a) a first flexible tubular bladder having a first exterior transverse dimension similar to a corresponding internal transverse dimension of a selected portion of a conduit and having a bladder length at least as great as a length of said selected portion of said conduit to be repaired;

at least one elongate spacer having a second exterior transverse dimension significantly smaller than said first exterior transverse dimension of said first flexible tubular bladder, said elongate spacer extending within said selected portion of said conduit alongside and in contact with an exterior of said first flexible tubular bladder and along substantially all of said length of said selected portion of said conduit, said first flexible tubular bladder and said elongate spacer cooperatively at least partly defining a passageway extending longitudinally along and within said selected portion of said conduit; and (c) a plurality of slender elongate members attached to said elongate spacer at respective apart-spaced locations and extending generally circumferentially about said first flexible tubular bladder.

16. The spacer system of claim 15, wherein said elongate spacer is a rod.

* * * * *